C. M. BRENNAN.
TROLLEY WHEEL.
APPLICATION FILED AUG. 31, 1910.
1,002,128.
Patented Aug. 29, 1911.
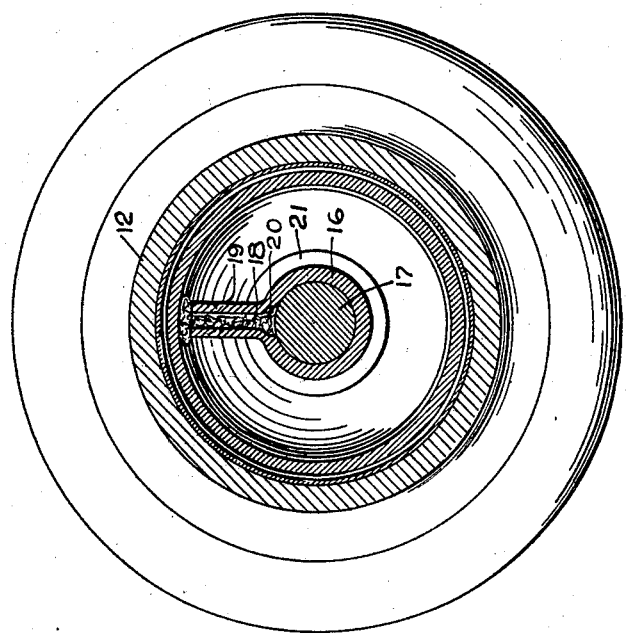
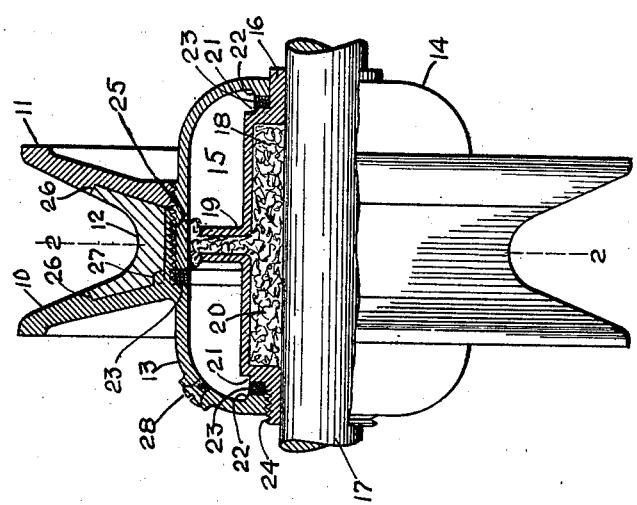
WITNESSES:
H. W. Meade
S. W. Atherton.
INVENTOR
Charles M. Brennan
BY
ATTORNEY

UNITED STATES PATENT OFFICE.

CHARLES M. BRENNAN, OF NAUGATUCK, CONNECTICUT.

TROLLEY-WHEEL.

1,002,128.   Specification of Letters Patent.   Patented Aug. 29, 1911.

Application filed August 31, 1910. Serial No. 579,866.

*To all whom it may concern:*

Be it known that I, CHARLES M. BRENNAN, a citizen of the United States, residing at Naugatuck, county of New Haven, State of Connecticut, have invented an Improvement in Trolley-Wheels, of which the following is a specification.

This invention has for its object to provide a simple, durable and inexpensive trolley wheel which shall be self-oiling and shall be provided with a tread which may be readily removed and replaced when worn, thus enabling the other parts of the wheel to be cast from less expensive metal.

With these and other objects in view I have devised the novel trolley wheel, of which the following description in connection with the accompanying drawing is a specification, reference characters being used to indicate the several parts.

Figure 1 is a view partly in elevation and partly in section, illustrating the construction of my novel wheel, and Fig. 2 is a section on the line 2—2 in Fig. 1.

10 and 11 denote the flanges, one of which is removable, 12 the tread, 13 and 14 cup-shaped shells which together form the reservoir, indicated as a whole by 15, 16 a sleeve by which the parts are carried and 17 a stud on which the wheel is adapted to rotate. The sleeve is provided with a chamber 18 open on the inner side, that is toward the stud, and provided with a hub 19. The chamber is filled with wicking, indicated by 20, which extends through the hub and into the reservoir which is filled with suitable lubricating material. The lubricant is taken up by the wicking and permeates the entire mass within the chamber so that the wheel is kept effectually lubricated but without waste of the lubricating material. At each end of the chamber and cast integral with the sleeve or secured thereto as may be preferred, is a collar 21. Each of the shells is provided on its inner side with a hub 22 and between each hub and the corresponding collar and between the ends of the shells are packing rings 23 to prevent escape of the lubricating material from the reservoir. One end of the sleeve, the left end as shown in Fig. 1, is provided with a screw thread 24, the other end of the sleeve being left smooth. One of the shells has a flange cast integral therewith; in the present instance flange 10 is cast upon shell 13, the hub of shell 13 being provided with an internal screw thread which engages thread 24 on the sleeve. The inner edge of shell 13 is provided with an internal screw thread 25 which is engaged by a corresponding external thread on the edge of shell 14. Flange 11, the removable flange, is provided with an internal screw thread which engages the thread on shell 14. Both of the flanges are provided on their inner faces with recesses 26 which receive the tread, preferably made of copper. One or both of the flanges are provided with inwardly extending lugs 27 which engage corresponding recesses in the tread to prevent the possibility of rotation of the tread independently of the shells and flanges. One of the shells is provided with a filling opening shown as closed by a screw 28.

In assembling, the packing washers are placed on the sleeve, then shell 13 and flange 10 are turned to place, then shell 14 is turned into close engagement with shell 13, then the tread is placed in position and finally flange 11 is turned to place. The wear from use is of course largely upon the tread. When a tread becomes worn it may be replaced by simply turning off flange 11, which leaves the tread free to be removed. After placing a new tread in position, flange 11 is turned back to place and the wheel is again ready for use with but a moment's delay and no expense other than a new tread, the wheel being then as good as new. So long as the reservoir is supplied with lubricating material, the wheel will be kept constantly lubricated without waste of the material.

Having thus described my invention I claim:

1. A trolley wheel comprising a sleeve provided with a radially extended longitudinal chamber, complemental cup shaped shells mounted on said sleeve and forming a reservoir, one of said shells being provided with a flange, a second flange secured to the other shell, a tread secured between the flanges, and means for conducting oil from said reservoir to said chamber.

2. A trolley wheel comprising a sleeve provided with collars at its ends and an intermediate radially extended longitudinal chamber, a shell having its outer end threaded upon one of said collars and also having a flange, a second shell slidably mounted on the other collar and having its inner end threaded into the first shell, whereby a reservoir is formed, a flange threaded upon the second shell, a tread secured between the flanges, and means for conducting oil from said reservoir to said chamber.

3. A trolley wheel comprising a sleeve having a chamber formed therein, the opposite ends of said sleeve being provided with collars, a hub formed on said sleeve, a shell threaded upon one of said collars and having its inner end internally threaded, a second shell slidably mounted upon the other collar and having its inner end externally threaded to engage the thread of the first mentioned shell whereby a reservoir is formed, wicking disposed in said chamber and passing through the hub of said sleeve, a flange formed integral with the first shell, a flange threaded upon the second shell, and a tread secured between said flanges.

In testimony whereof I affix my signature in presence of two witnesses.

CHARLES M. BRENNAN.

Witnesses:
 THOMAS O'LOUGHLIN,
 CLAYTON L. KLEIN.

Copies of this patent may be obtained for five cents each, by addressing the "Commissioner of Patents, Washington, D. C."